2 Sheets--Sheet 1.

S. E. TOMPKINS.

Saddle-Trees.

No. 5,495. Reissued July 15, 1873.

Witnesses:

James A. Hunter.

Jas. Thos. Smith

Inventor:

Sam'l E. Tompkins

AM. PHOTO-LITHOGRAPHIC CO. N.Y. (OSBORNE'S PROCESS.)

2 Sheets--Sheet 2.

S. E. TOMPKINS.

Saddle-Trees.

No. 5,495. Reissued July 15, 1873.

Witnesses:

James A. Hunter.

Jas. Prospritt

Inventor:

Sam'l E. Tompkins

A.M. PHOTO-LITHOGRAPHIC CO. N.Y. (OSBORNE'S PROCESS.)

UNITED STATES PATENT OFFICE.

SAMUEL E. TOMPKINS, OF SING SING, NEW YORK.

IMPROVEMENT IN SADDLE-TREES.

Specification forming part of Letters Patent No. 30,168, dated September 25, 1860; reissue No. 4,709, dated January 9, 1872; reissue No. 5,495, dated July 15, 1873; application filed May 29, 1873.

*To all whom it may concern:*

Be it known that I, SAMUEL E. TOMPKINS, of Sing Sing, in the State of New York, have invented certain new and useful Improvements in Gig Saddle-Trees; and do hereby declare that the following is a full, clear, and exact description thereof, reference being had to the accompanying drawings making part of this specification.

My improvements consist, first, in providing depressions to the sides, within which to retain the stiffener or stiffeners and tongue of flap; second, in providing such depressions with level flanges for the purpose of avoiding blocking up; third, in providing improved means by which the stiffeners and tongue of flap can be secured within such depressions, and the tree be finished up from the underneath side; fourth, in providing improved means by which the flap may be secured to such flanges; fifth, in an interposed leather, by reason of which the seat may be finished up with leather, &c., before being attached to the tree, and to which the leather of the seat may be conveniently attached, if desired; also, which admits of the flaps and fore-pieces being put in place without skiving down the gullet-pieces in order to get smooth and uniform surfaces on which the jockeys are to rest, thus giving to the finisher up of the saddle a tree with the seat and jockeys already attached; sixth, in an improved form of tree which approaches more nearly the shape of the back of the animal on which it is to be placed, and consists in leaving at the upper part of the under side of the depressions, which depressions form bearings, a gradual slope for a short distance, and leaving the whole underneath surface of the tree a little flaring toward the back part of the same; seventh, in a projection on the upper and front portion of the tree, in combination with a recess on the under side of the seat in which such projection rests to support the front side of the seat; eighth, in a jog on the under side of the tree, in combination with a shoulder on the check-rein hook.

Figure 1:
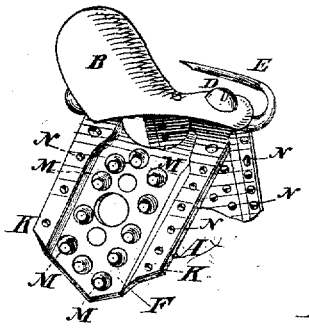
Figure 2:
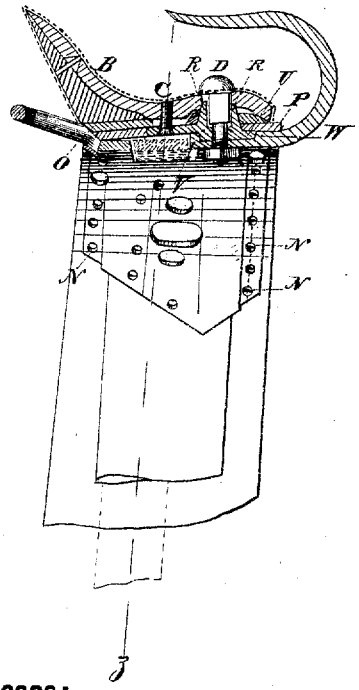
Figure 3:
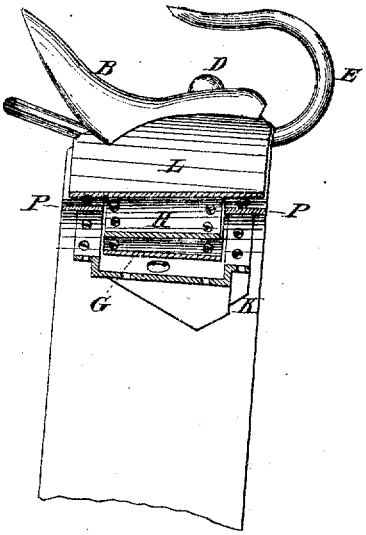
Figure 4:
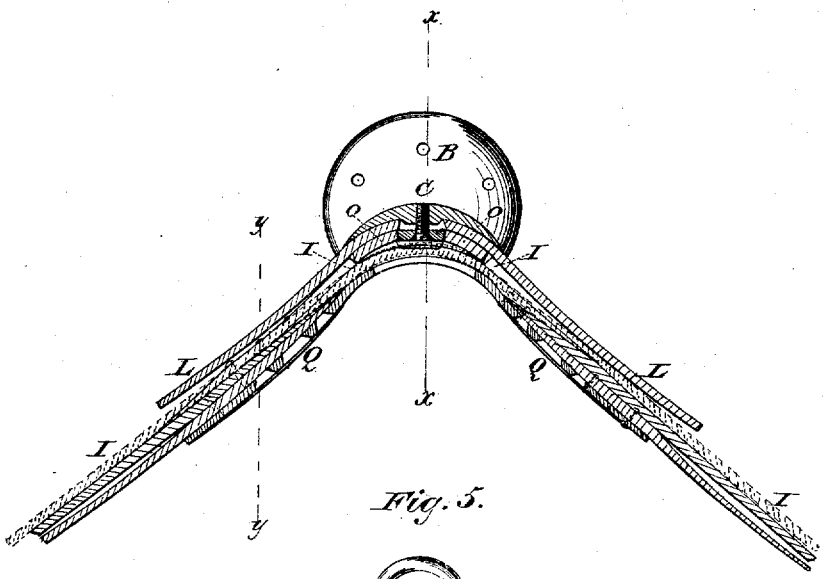
Figure 5:
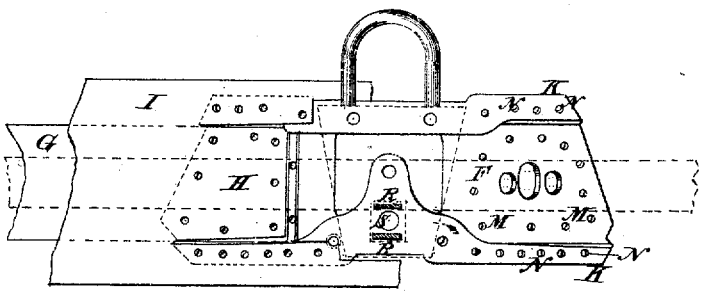

In the drawings, which serve to illustrate my improvements, Figure 1 is a perspective view of the saddle-tree with the seat and check-rein hook attached. Fig. 2 is a vertical central section of the tree when finished up complete taken in line *x x* of Fig. 4. Fig. 3 is a section taken the line *y y* of Fig. 4. Fig. 4 is a section taken in the line *z z* of Fig. 2. Fig. 5 is a plan or top view of the saddle-tree with a portion of the parts of a finished-up tree shown attached.

A is the frame, composed of metal; B, the seat. These parts are secured together by a screw, C, and bolt D, the latter also retaining the check-rein hook E in place. F F are depressions made in the tree, so as to wholly retain the stiffeners G G and tongue H of the flap I, and thus enable the back-band to pass down onto and over their upper surfaces, such stiffeners and tongue of flap coming up flush with the top of the flanges K K of the tree. These flanges are made level—that is, straight—so that the flap will rest on same without the necessity of any intervening blocking, and bringing the flaps and back-band so together that the jockey L will rest on top surface of same in a smooth and even manner. In these depressions are a number of small holes, M, M, &c., which serve as a means by which small nails may retain the stiffeners and tongue of flap, in working or finishing up the saddle from the under side, in a convenient manner. In the level and upper faces of these flanges are similar holes N N, &c., which serve as a means by which nails may retain the flap, and any other portion of the saddle attached to such flap to the flanges. O is a piece of leather interposed between the seat and tree, separate and distinct from any other leather portion of the tree, to which may be attached the leather of the front and back part of seat in finishing up of the tree; the flaps may also be brought up to it on either side; also, the fore pieces P producing an even and unbroken surface throughout, thus avoiding the previous necessity of skiving down the gullet-piece in bringing the parts together, and permitting of the attachment of the jockey L, if so desired, instead of passing it clear through in one piece, as formerly practiced, on either side in an easy and convenient manner, and without the necessity of seaming as formerly practiced with first-class work.

It will be observed that the depressions which retain the stiffener or stiffeners and tongue of flap about level with the flanges are not fully depressed on the under side at the top, but at first gradually slope down, as seen at Q, and the whole underneath surface flares outward from the front toward the rear of the saddle-tree. This will be seen from the fact that the rear flanges appear more elevated than the front flanges, which latter flanges have the appearance of an inverted V. This construction gives such a form to the underneath part of the saddle that it conforms more nearly to the shoulders of the horse on which it may be placed than saddles heretofore constructed.

On the frame A, I place one or more projections, R R. In the particular instance shown in the drawing, one is at the front and one is at the back of the bolt-hole S. These form bearings for the seat, and prevent its being drawn down onto the interposed leather O in securing the parts together. The projections fit into recesses T T in the under side of the seat, thereby preventing the shifting of the seat in a lateral direction. The front part of the frame A at its under side is made flat and square, as shown at U, in order to secure it in a firm and rigid manner to the flat portion of the check-rein hook. The flat portion of the check-rein hook is provided with shoulders V, the front shoulder bearing against the front edge of the frame A, and the rear one locking behind a jog, W, at the under side of the frame.

With this construction, when the nut of the bolt is screwed up the check-rein hook will be retained firmly in place, and all forward strain taken off the nut and screw.

I claim—

1. A saddle-tree, when constructed with depressions in its sides retaining the stiffener or stiffeners and tongues of flap wholly within such depressions and flush with the top of the flanges, substantially as described.

2. A saddle-tree, when constructed with depressions in its sides retaining the stiffener or stiffeners and tongue of flap, substantially as described, in combination with the level flanges.

3. A saddle-tree constructed with depressions in its sides for retaining the stiffener or stiffeners and tongue of flap, such depressions containing a series of holes, substantially as described.

4. A saddle-tree containing such depressions and level flanges, such flanges containing a series of holes, substantially as described.

5. An interposed or separate piece of leather applied to a removable seat-tree, substantially as and for the purposes described.

6. The arrangement of the underneath surface, substantially as described, of a cast-metal harness saddle-tree containing depressions F F in its sides, which depressions form bearings on the under side.

7. The combination of a projection on the tree for retaining the seat in position, with recesses in the under side of the said seat, in which said projection rests, and serves as a support and rest for the front side of the seat.

8. A hook constructed with a shoulder at its rear, when combined and arranged with a jog on the under side of the tree, substantially as described.

SAM. E. TOMPKINS.

Witnesses:

JAMES H. HUNTER,
SAM. TRO. SMITH.